Patented May 12, 1942

2,282,469

UNITED STATES PATENT OFFICE 2,282,469

PRODUCTION OF ETHERS FROM ALCOHOLS

Per K. Frolich, Westfield, N. J., assignor to Standard Oil Development Company, a corporation of Delaware No Drawing. Application May 11, 1938, Serial No. 207,310

6 Claims. (Cl. 260—614)

This invention relates to the manufacture of ethers from alcohols and specifically it relates to the manufacture of ethers directly from alcohols by contacting with catalysts.

The manufacture of ethers from alcohols is well known and the general method used heretofore was by reacting alcohol and sulfuric acid to form a reactive acid liquor, then heating the reactive acid liquor to produce ethers, vaporizing the ethers and isolating the ethers from the vapors that are evolved.

An object of this invention is to manufacture ethers directly from alcohols without reacting with sulfuric acid to form a reactive acid liquor and then heating to have the ethers form.

According to this invention, it was found that ethers, particularly mixed ethers, may be formed directly from alcohols. The temperatures used are from 150° to 350° F. and the ethers are formed on passing the alcohol or mixture of alcohols in proper proportions over a hydrating catalytic body maintained at these elevated temperatures. A number of catalysts were found that may be used to accomplish this reaction. The catalysts preferred are phosphoric acid, sulfuric acid, persulfuric acid, or other strong acids, either alone or in admixture, deposited on an inert carrier or supporting agent, such as kieselguhr, pumice, alumina, etc. The carrier or supporting material impregnated with the acid was spread along a tube or trough heated to the desired temperature and then the alcohol, also heated to the desired temperature, was passed over the material therein. The alcohols that may be treated according to this invention are the aliphatic alcohols having from 3 to 5 carbon atoms to the molecule. The alcohols are treated in admixtures, more or at least equal quantities of the more stable alcohols being used in proportion to the more reactive alcohol. A conversion of 10% to 45% may be obtained, depending upon the temperatures and volumes treated.

The following general examples are illustrative of the effects the proportion of the two alcohols have on the yields of the final ethers produced according to this invention.

Example 1

Methyl tertiary butyl ether was prepared according to this invention by using kieselguhr impregnated with about 50% by weight of phosphoric acid. The volume of catalyst used was about 150 ml. The catalyst with its carrier was heated to a temperature of about 175° F. Over this catalyst was passed a mixture of 150 ml. of methyl alcohol and 150 ml. of tertiary butyl alcohol at the rate of 200 ml. per hour. There was formed a crude product consisting of 95 ml., which on washing and fractionation yielded 72 ml. of methyl tertiary butyl ether equivalent to 37% of the alcohols.

Example 2

Methyl tertiary butyl ether was also prepared by passing a mixture of 233 ml. of tertiary butyl alcohol and 100 ml. of methyl alcohol at the rate of 71 ml. per hour over 100 ml. of the same catalyst as used in Example 1. The catalyst was heated to a temperature of about 350° F. There was formed a crude product consisting of 148 ml. which on washing and fractionation yielded 43 ml. of methyl tertiary butyl ether, i. e. equivalent to 14% of the alcohols.

This invention is not to be limited to the specific embodiments shown or to the specific examples given, nor to any theories advanced as to the operation of the invention, but in the appended claims it is intended to claim all inherent novelty in the invention as broadly as the prior art permits.

I claim:

1. An improved process for converting alcohols into mixed branched chain ethers in which a mixture of the alcohols is passed over an inert carrier carrying a hydration acid catalyst, the step of providing a mixture of alcohols of at least two different types, the more highly branched being in excess of the less highly branched.

2. The direct conversion of alcohols into mixed ethers, comprising passing a mixture of at least 50% of a primary alcohol and a tertiary alcohol at a temperature of 150° to 350° F. over an inert carrier supporting a hydrating acid catalyst and separating the ethers thereby formed.

3. The method of producing ethers, which comprises passing a mixture of tertiary and primary alcohols of 3 to 5 carbon atoms to the molecule containing at least 50% of the primary alcohol over a hydrating acid catalyst supported on an inert solid material at a temperature of 150° to 350° F. and separating the mixture of ethers thereby formed.

4. The process of manufacturing ethers, which comprises passing a mixture of tertiary and primary aliphatic alcohols of 3 to 5 carbon atoms to the molecule containing at least 50% of the primary aliphatic alcohol over an inert carrier impregnated with sulfuric acid at a temperature of about 150° to 350° F. and separating the ethers thereby formed.

5. The process of manufacturing mixed ethers, which comprises passing a mixture of equal volumes of a tertiary and primary ether over an inert carrier impregnated with a hydrating acid catalyst at the rate of 1 volume of the mixture of alcohols per 1 volume of the hydrating acid catalyst at a temperature of about 175° F. and separating the ethers thereby formed.

6. The process of manufacturing ethers according to claim 5 in which tertiary butyl alcohol and methyl alcohol are used to produce methyl tertiary butyl ether.

PER K. FROLICH.